United States Patent [19]
Bloom

[11] Patent Number: 5,971,629
[45] Date of Patent: Oct. 26, 1999

[54] APPARATUS AND METHOD BONDING OPTICAL FIBER AND/OR DEVICE TO EXTERNAL ELEMENT USING COMPLIANT MATERIAL INTERFACE

[76] Inventor: Cary Bloom, 5272 River Rd., Suite 530, Bethesda, Md. 20816

[21] Appl. No.: 08/866,385

[22] Filed: May 30, 1997

Related U.S. Application Data

[63] Continuation-in-part of application No. 08/679,059, Jul. 12, 1996, Pat. No. 5,680,495, and application No. 08/763,052, Dec. 10, 1996
[60] Provisional application No. 60/040,875, Mar. 21, 1997.
[51] Int. Cl.[6] .................................................. G02B 6/36
[52] U.S. Cl. ............................................................ 385/94
[58] Field of Search .......................................... 385/80–94

[56] References Cited

U.S. PATENT DOCUMENTS

| Re. 33,296 | 8/1990 | Stowe et al. . |
| Re. 34,955 | 5/1995 | Anton et al. . |
| 3,854,003 | 12/1974 | Duret . |
| 4,026,632 | 5/1977 | Hill et al. . |
| 4,611,894 | 9/1986 | Roberts . |

(List continued on next page.)

FOREIGN PATENT DOCUMENTS

| 58216216 | 12/1983 | European Pat. Off. . |
| 0 104 513 | 4/1984 | European Pat. Off. . |
| 0293289 | 5/1988 | European Pat. Off. . |
| 0 628 840 | 12/1994 | European Pat. Off. . |
| 2235043A | 8/1990 | United Kingdom . |
| WO87/00934 | 7/1986 | WIPO . |
| 0215668A2 | 9/1986 | WIPO . |
| WO 93/13442 | 7/1993 | WIPO . |
| WO 96/37794 | 11/1996 | WIPO . |

OTHER PUBLICATIONS

"Automated Fabrication of Fused Fibre Optic Couplers", Swain, R., M. Phil. dissertation, Heriot–Watt University, Edinburgh, Ireland (1993).

"Tapered Optical Fiber Components and Sensors", by L.C. Bobb, et al., Microwave journal, May 1992.
"The Shape of Fiber Tapers", by T.A. Birks et al., Journal of Lightwave Technology, IEEE, vol. 10, No. 4, Apr. 1992, pp. 432–438.
"Mass Production of Fused Couplers and Coupler Based Devices", by W.E. Moore et al.
"Loss and Spectral Control in Fused Tapered Couplers", by K.P. Oakley et al., Optical Engineering, vol. 33, No. 12, Dec. 1994, pp. 4006–4019.
"Control of Optical Fibre Taper Shape", Electronics Letters, vol. 27, No. 18, Aug. 29, 1991.
"Fiber–Coupler Fabrication with Automatic Fusion–Elongation Processes for Low Excess Loss and High Coupling-Ratio Accuracy", by I. Yokohama, et al., Journal of Lightwave Technology, IEEE, vol. LT–5, No. 7, Jul. 1987.
IC Assembly Technology, pp. 3–26—3–32.
Fibre–optic Coupler Fabrication at AOFR, by A.J. Stevenson et al., International Journal of Optoelectronics, vol. 6, Nos. 1/2, 1991, pp. 127–144.

(List continued on next page.)

*Primary Examiner*—Akm E. Ullah
*Attorney, Agent, or Firm*—Irah H. Donner; Pepper Hamilton LLP

[57] ABSTRACT

An apparatus includes a device having at least one exposed region. First and second metal seals bond and/or secure with, and surround, the exposed region of the device. An enclosure seals the device between the first and second metal seals. The enclosure has a first substrate and a second substrate, each with end surfaces including a deformable metal layer. The deformable metal layer seals the corresponding surfaces in response to the application of a compressive force and/or energy to the first and second substrates. The enclosure may be constructed to include a cavity, and/or constructed of relative short length. The enclosure may be used to secure to a portion of an optical fiber, fiber optic device and/or device, and/or may be used to encase a portion or all of an optical fiber, fiber optic device and/or device.

23 Claims, 16 Drawing Sheets

U.S. PATENT DOCUMENTS

| | | |
|---|---|---|
| 4,699,453 | 10/1987 | Roberts . |
| 4,701,010 | 10/1987 | Roberts . |
| 4,714,316 | 12/1987 | Moore et al. . |
| 4,763,977 | 8/1988 | Kawasaki et al. . |
| 4,772,085 | 9/1988 | Moore et al. . |
| 4,779,945 | 10/1988 | Hill et al. . |
| 4,792,203 | 12/1988 | Nelson et al. . |
| 4,798,438 | 1/1989 | Moore et al. . |
| 4,834,481 | 5/1989 | Lawson et al. . |
| 4,895,423 | 1/1990 | Bilodeau et al. . |
| 4,900,119 | 2/1990 | Hill et al. . |
| 4,906,068 | 3/1990 | Olson et al. . |
| 4,923,273 | 5/1990 | Taylor . |
| 4,957,338 | 9/1990 | Thorncraft et al. . |
| 4,995,688 | 2/1991 | Anton et al. . |
| 4,997,243 | 3/1991 | Aiki et al. . |
| 4,997,245 | 3/1991 | DuPuy et al. . |
| 4,997,247 | 3/1991 | Stowe . |
| 4,997,248 | 3/1991 | Stowe . |
| 4,997,252 | 3/1991 | Sugawara et al. . |
| 4,997,253 | 3/1991 | Enochs . |
| 5,013,117 | 5/1991 | Fukuma . |
| 5,013,121 | 5/1991 | Anton et al. . |
| 5,028,110 | 7/1991 | Plummer . |
| 5,031,994 | 7/1991 | Emmons . |
| 5,037,176 | 8/1991 | Roberts et al. . |
| 5,066,149 | 11/1991 | Wheeler et al. . |
| 5,067,678 | 11/1991 | Henneberger et al. . |
| 5,093,885 | 3/1992 | Anton . |
| 5,121,453 | 6/1992 | Orazi et al. . |
| 5,123,219 | 6/1992 | Beard et al. . |
| 5,136,121 | 8/1992 | Kluska et al. . |
| 5,142,763 | 9/1992 | Toya et al. ............................ 29/517 |
| 5,157,751 | 10/1992 | Maas et al. . |
| 5,157,753 | 10/1992 | Rogers, Jr. ............................ 385/115 |
| 5,159,655 | 10/1992 | Ziebol . |
| 5,166,992 | 11/1992 | Cassidy et al. . |
| 5,166,994 | 11/1992 | Stowe et al. . |
| 5,179,608 | 1/1993 | Ziebol et al. . |
| 5,179,618 | 1/1993 | Anton . |
| 5,189,723 | 2/1993 | Johnson et al. . |
| 5,208,894 | 5/1993 | Johnson et al. . |
| 5,210,391 | 5/1993 | Yoshie et al. ...................... 219/121.63 |
| 5,214,732 | 5/1993 | Beard et al. . |
| 5,214,735 | 5/1993 | Henneberger et al. . |
| 5,222,176 | 6/1993 | Webber et al. . |
| 5,239,604 | 8/1993 | Ziebol et al. . |
| 5,251,002 | 10/1993 | Gryk . |
| 5,261,019 | 11/1993 | Beard et al. . |
| 5,274,731 | 12/1993 | White . |
| 5,283,852 | 2/1994 | Gibler et al. . |
| 5,293,440 | 3/1994 | Miles et al. . |
| 5,293,582 | 3/1994 | Beard et al. . |
| 5,305,405 | 4/1994 | Emmons et al. . |
| 5,316,243 | 5/1994 | Henneberger . |
| 5,317,663 | 5/1994 | Beard et al. . |
| 5,319,728 | 6/1994 | Lu et al. . |
| 5,319,733 | 6/1994 | Emmons et al. . |
| 5,329,600 | 7/1994 | Sasaoka et al. . |
| 5,343,544 | 8/1994 | Boyd et al. . |
| 5,355,426 | 10/1994 | Daniel et al. . |
| 5,363,465 | 11/1994 | Korkowski et al. . |
| 5,367,591 | 11/1994 | Seike et al. . |
| 5,381,497 | 1/1995 | Toland et al. . |
| 5,386,484 | 1/1995 | Ooka et al. . |
| 5,386,488 | 1/1995 | Oikawa . |
| 5,386,490 | 1/1995 | Pan et al. . |
| 5,395,101 | 3/1995 | Takimoto et al. . |
| 5,422,969 | 6/1995 | Eno . |
| 5,432,875 | 7/1995 | Korkowski et al. . |
| 5,445,319 | 8/1995 | Pan et al. . |
| 5,459,598 | 10/1995 | Carrington . |
| 5,463,704 | 10/1995 | Ziebol . |
| 5,475,780 | 12/1995 | Mizrahi . |
| 5,475,782 | 12/1995 | Ziebol . |
| 5,475,784 | 12/1995 | Bookbinder et al. . |
| 5,497,444 | 3/1996 | Wheeler . |
| 5,533,158 | 7/1996 | Han et al. ............................... 385/88 |
| 5,577,149 | 11/1996 | Averbeck et al. . |
| 5,588,087 | 12/1996 | Emmons et al. . |
| 5,602,952 | 2/1997 | Rashleigh et al. . |
| 5,664,040 | 9/1997 | Kramer et al. ........................... 385/78 |
| 5,793,916 | 8/1998 | Dahringer et al. ....................... 385/95 |

OTHER PUBLICATIONS

"From your space . . . to outer space", Fibre Bragg Gratings, 3M Innovation, Circle No. 76. (No Date).

"100ips & 2 microns", Anorad linear motor gantries, Anorad Corporation, Circle 7. (No Date).

"1$\mu$m, 2g, 3m/s", Anorad LW linear motor stages, Anorad Corporation, Circle 7. (No Date).

"The New Standard for Case Erecting and Sealing", ABC Packaging Machine Corporation, Circle 22. (No Date).

"All Product Brochure" Schleuniger, Inc., pp. 1–12. (No Date).

"Schleuiger US 2545 Stripping Machine", Schleuniger, Inc. (No Date).

"Schleuniger FO 7010 Kelvar Cutting Machine", Schleuniger, Inc. (No Date).

"Schleuniger PF 1000/PF 2000 Electric Demand Prefeeders", Schleuniger, Inc. (No Date).

"CP 1200 Coiling Unit", Schleuniger, Inc. (No Date).

"Schleuniger WS 1500/CP 1250 Wire Stacker/Coiling Pan", Schleuniger, Inc. (No Date).

"Premise Wiring Communication Fiber Optics", Fiber Instrument Sales Inc., 15th Edition, 1997, pp. 1–68. (No Date).

APPARATUS AND METHOD BONDING OPTICAL FIBER AND/OR DEVICE TO EXTERNAL ELEMENT USING COMPLIANT MATERIAL INTERFACE

RELATED APPLICATIONS

This application claims priority from U.S. provisional application Ser. no. 60/040,875, filed on Mar. 21, 1997, entitled "Methods, Devices and Articles of Manufacture for Optical Fibers and Optical Fiber Systems", incorporated herein by reference. This application is a continuation-in-part application of U.S. application Ser. No. 08/679,059, now. U.S. Pat. No. 5,680,495 filed on Jul. 12, 1996, and U.S. application Ser. No. 08/763,052, filed on Dec. 10, 1996, incorporated herein by reference.

BACKGROUND OF THE INVENTION

1. Field of the Invention

The present invention relates to an apparatus and method for bonding optical fiber and/or device to external element using compliant material interface, and more particularly, to an apparatus and method for bonding an optical fiber and/or device to an external substrate for strength, support, and protection.

2. Background of the Related Art

Currently, various techniques exist for stabilizing an optical fiber and/or device to an external substrate. For example, one technique involves using an epoxy to affix the optical fiber to an external substrate. Another technique disclosed in U.S. Pat. No. 5,475,784 to Bookbinder, et al. encapsulates a segment of organic material of an optical component, such as a junction, by directly placing molten metal around the component and solidifying the metal.

However, the resulting bonded optical fiber(s) or device according to these prior techniques often times is not properly protected and/or affixed. These processes are difficult to automate as well. Thus, this process does not provide good yield results. Further, these crude processes limit the types of optical devices that can be packaged and protected thereby.

It is therefore desirable to provide accurate and consistent production of high quality optical fibers and/or devices that are bonded to an external substrate for strength, support, and protection.

It is also desirable to provide high quality optical fibers and/or devices that are packaged to protect same.

It is also desirable to provide production techniques to package optical fibers and/or devices that may be highly temperature sensitive, e.g., planar optical fiber.

It is also desirable to provide production techniques to package and/or hermetically package optical fibers and/or devices quickly, inexpensively and in a highly automated manner.

It is also desirable to provide production techniques to package and/or hermetically package optical fibers and/or devices for a passive fiber optic component manufacturer.

SUMMARY OF THE INVENTION

A feature and advantage of the invention is in providing accurate and consistent production packaging of high quality fiber optic devices.

Another feature and advantage of the invention is that its principal use is, for example, in device production for a passive fiber optic component manufacturer.

Another feature and advantage of the invention is in providing accurate and consistent production of high quality fiber optic devices.

Another feature and advantage of the invention is in providing accurate and consistent production of high quality optical fibers and/or devices that are bonded to an external substrate for strength, support, and protection.

Another feature and advantage of the invention is in providing high quality optical fibers and/or devices that are packaged to protect same.

Another feature and advantage of the invention is in providing production techniques to package optical fibers and/or devices that are highly temperature sensitive.

Another feature and advantage of the invention is in providing production techniques to hermetically package optical fibers and/or devices quickly, inexpensively and in a highly automated manner.

Another feature and advantage of the invention is in providing production techniques to hermetically package optical fibers and/or devices for a passive fiber optic component manufacturer.

The present invention is based, in part, on the discovery or identification of the problem that during standard optical fiber and/or device production, the optical fiber and/or device is not being stabilized, bonded, sealed, hermetically sealed and/or packaged in a quick, inexpensive and highly automated manner. Accordingly, the manufacturing/production industry of optical fibers and/or devices has been unable to meet the demands to satisfy industry needs of same. As a result, optical fibers and/or devices are unnecessarily expensive due to the standard economic supply/demand theory.

Advantageously, I have discovered that a simple procedure may be used to stabilize, bond, seal, hermetically seal and/or package an optical fiber and/or device in a quick, inexpensive and highly automated manner. Accordingly, optical fiber and/or device production will be greatly increased due to this new category or class of techniques described herein.

In addition, I have discovered that the above techniques may be used for highly temperature sensitive optical fibers and/or devices. Further, I have discovered that the above techniques may be used for accurate and consistent production of high quality optical fibers and/or devices that are bonded to an external substrate for strength, support, and protection.

In accordance with one embodiment of the invention, an apparatus includes a device having at least one exposed region. First and second metal seals bond and/or secure with, and surround, the exposed region of the device. An enclosure seals the device between the first and second metal seals. The enclosure has a first substrate and a second substrate, each with end surfaces including a deformable metal layer. The deformable metal layer seals the corresponding surfaces in response to the application of a compressive force and/or energy to the first and second substrates. The enclosure may be constructed to include a cavity, and/or constructed of relative short length. The enclosure may be used to secure to a portion of an optical fiber, fiber optic device and/or device, and/or may be used to encase a portion or all of an optical fiber, fiber optic device and/or device.

In accordance with another embodiment of the invention, an apparatus includes at least one optical fiber, device and fiber optic device, including a region and having a first thermal coefficient of expansion. A first securing material surrounds the region of the at least one optical fiber, device and fiber optic device, and has a second thermal coefficient of expansion greater than the first thermal coefficient of expansion. A cusp has first and second sections and a cavity, and covers the first securing material and the region. The cusp includes an expansion joint between the first and second sections, and the expansion joint has a third thermal coefficient of expansion substantially similar to the second thermal coefficient of expansion.

In accordance with another embodiment of the invention, a method includes the step of providing an optical fiber, device and/or fiber optic device that includes a region and has a first thermal coefficient of expansion. The method includes the step of disposing a securing material at the region of the optical fiber, device and/or fiber optic device. The securing material has a second thermal coefficient of expansion greater than the first thermal coefficient of expansion. The method also includes the step of covering the securing material and the region with first and second sections. The first and second sections have third and fourth thermal coefficients of expansion substantially similar to the first thermal coefficient of expansion. The method also includes the step of providing an expansion joint between the first and second sections. The expansion joint has a fifth thermal coefficient of expansion substantially similar to the second thermal coefficient of expansion. The method also includes the step of applying a compressive force and/or energy to seal, secure and/or hermetically seal the optical fiber, device and/or fiber optic device using the securing material and the first and second sections.

These together with other objects and advantages which will be subsequently apparent, reside in the details of construction and operation as more fully herein described and claimed, with reference being had to the accompanying drawings forming a part hereof wherein like numerals refer to like elements throughout.

DESCRIPTION OF PREFERRED EMBODIMENT OF THE INVENTION

The present invention is used on, and provides accurate and reliable production and/or packaging of, optical fibers, devices and/or fiber optic devices such as couplers, switches, wave-division multiplexers (WDM), filters, attenuators, polarizers, waveguides, fiber optic sensors and the like, that provide substantially similar optical responses, properties and/or indicators. These various fiber optic devices, such as the WDM, may be constructed of different materials such as glass, crystal, metal, plastic, ceramic and the like.

The present invention is used on, and provides accurate and reliable production and/or packaging of, optical fibers, devices and/or fiber optic devices for reinforcing, sealing and packaging of same, described above. One principal advantage of this procedure is that it allows the optical fiber, device and/or fiber optic device to be sealed and/or hermetically sealed possibly without exposing same to damaging temperature extremes. A principal use of this procedure could be to package optical devices that may be highly temperature sensitive. This technique will quickly and inexpensively package and/or hermetically package temperature sensitive devices in a highly automated manner.

Another principal advantage of this procedure is that it allows an optical fiber, device, and/or fiber optic device to be hermetically sealed quickly, simply, reliably, and inexpensively. A principal use of this procedure could be to hermetically package devices for a passive fiber optic component manufacturer. This technique will also quickly and inexpensively hermetically package devices in a highly automated manner.

To illustrate the above techniques, I will conceptually demonstrate the packaging of a fused-biconical tapered (FBT) coupler. The packaging of other optical fibers, devices, and/or fiber optic devices would be similar. The device in the examples described below has multiple optical fibers exiting opposite sides of the device. However, the techniques described herein could also be applied to any device with at least a single optical fiber exiting therefrom.

The production and/or packaging of other optical fibers, devices and/or fiber optic devices would be similar (with the exception that some steps may be added and/or omitted based on the specific device being formed), including production of single optical fibers and/or devices.

Figure 1:
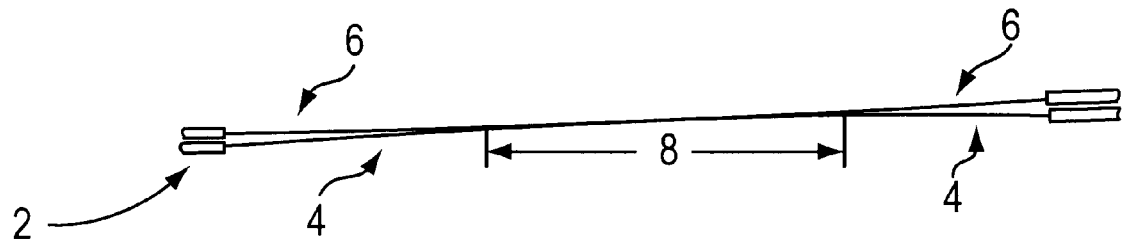
FIG. 1 shows a fused-biconical tapered coupler for use in the process according to a first embodiment of the invention.

FIGS. 1–19 are illustrations of the process of the present invention according to a first embodiment of the invention. FIG. 1 shows a fused-biconical tapered coupler 2 of two optical fibers 4, 6 that have been stripped of their coating in the fused region area 8. To properly package this device 2, the fused tapered region 8 must be secured, supported, and protected without any direct contact with the packaging.

Figure 2:
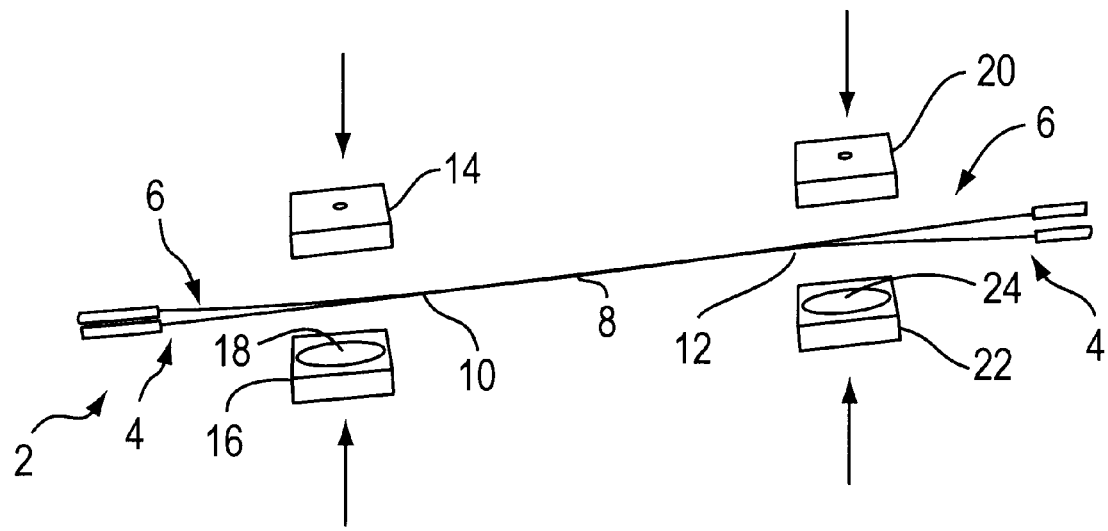
FIG. 2 shows the creation of anchoring points that will be used to secure the coupler to the packaging in the process according to a first embodiment of the invention.

FIG. 2 is the first step in this packaging procedure to create anchoring points at anchoring locations 10, 12 that will be used to secure the coupler 2 to the packaging. To allow a standard package size to be used, the anchor locations 10, 12 will generally be offset from the center of the device (e.g., fused region 8) by a standard distance. The offset distance is generally sufficient to place the anchoring locations 10, 12 close to, yet safely outside, the fused region 8. To create the anchor locations 10, 12, forms shown as blocks above (e.g., blocks 14, 20) and below (e.g., blocks 16, 22) the optical fibers 4, 6 are moved into place around the pre-determined anchoring locations 10, 12.

Blocks 14, 16, 20, and 22 advantageously include groove locations to create the anchor points at the anchor locations 10, 12. For example, block 16 includes groove 18 and block 22 includes groove 24. Other techniques of forming the anchor points may also be used.

Figure 3:
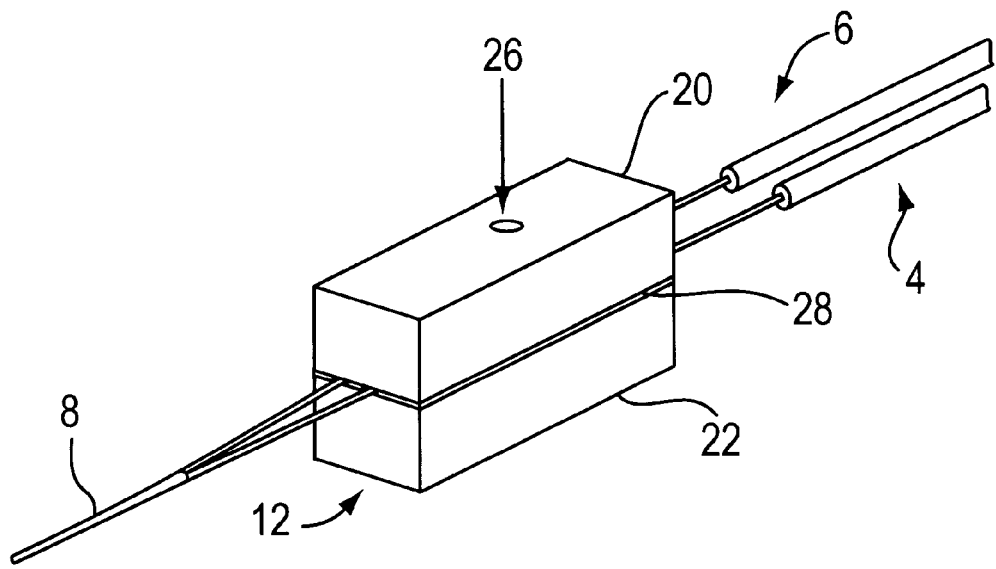
FIG. 3 shows a form shown in place around the optical fibers at an intended anchoring location in the process according to a first embodiment of the invention.

FIG. 3 is a form 20, 22 shown in place around the optical fibers 4, 6 at an anchoring location 12 outside the fused region 8. To create the anchoring point 12, pure liquid aluminum is injected into the form 20, 22 at aperture 26, and allowed to cool. As the aluminum cools, it safely chemically bonds to and compresses around the optical fibers 4, 6, although other materials may be used that do not chemically bond per se. That is, other materials may also be used to bond or secure to or compress around the optical fibers to form the anchoring points. In addition, the bonding material need not necessarily be poured, as explained in greater detail below in connection with the second embodiment of the invention.

Further, forms/blocks may also not be necessary depending on the type of anchor point being produced. For example, when a liquid material is used for bonding, the liquid material may simply be poured on the optical fiber, device and/or fiber optic device. Alternatively, metal blocks can be used as well and liquified in place.

Figure 4:
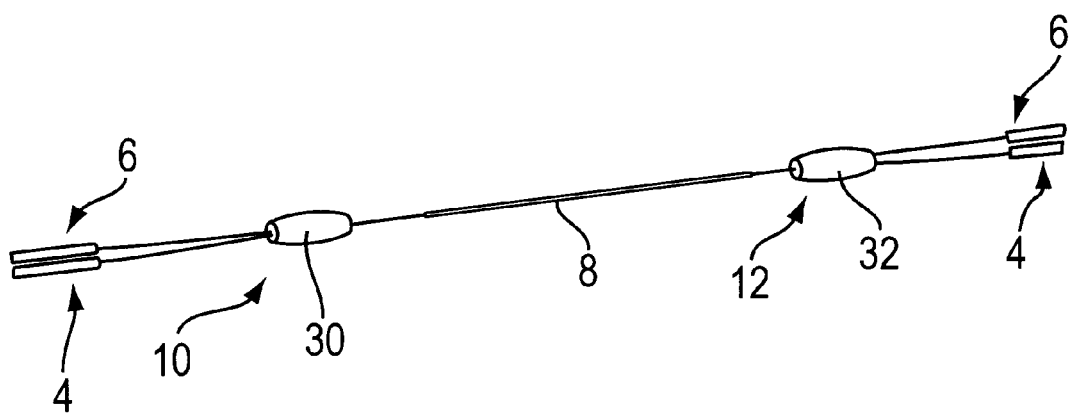
FIG. 4 shows the anchoring points after the aluminum has cooled and solidified, and after the forms are removed in the process according to a first embodiment of the invention.
Figure 5:
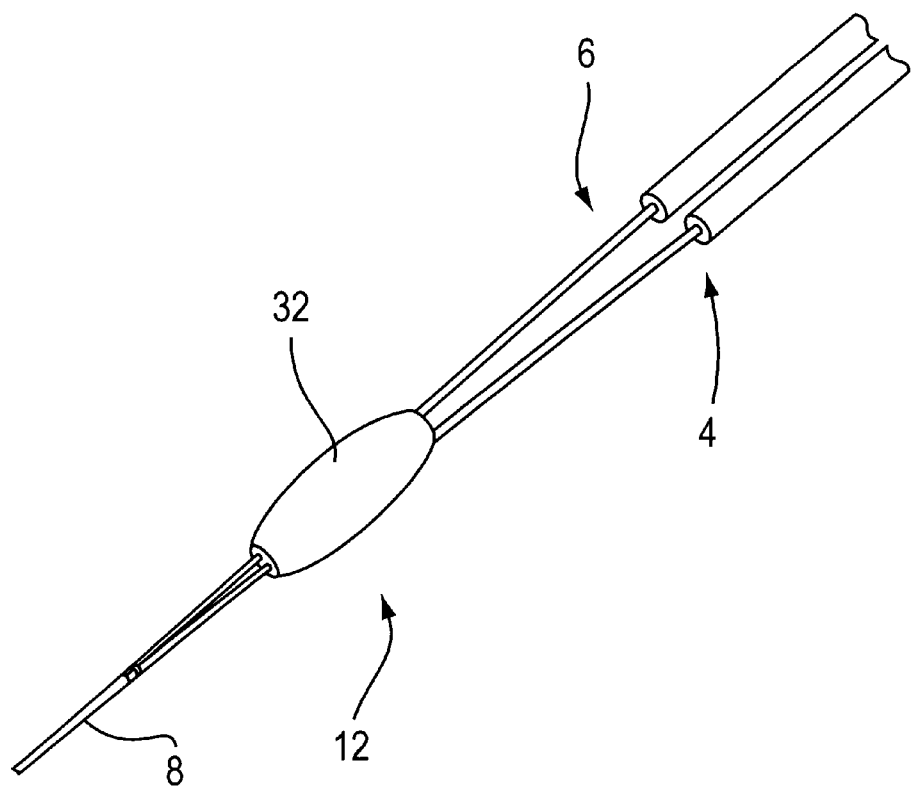
FIG. 5 shows a close up of an aluminum anchoring point forming a tight seal around the optical fibers in the process according to a first embodiment of the invention.

In FIG. 4, after the aluminum has cooled and solidified, the forms are removed. The FBT coupler with optical fibers 4, 6 now has anchoring points 30, 32 at anchor locations 10, 12 respectively safely attached and is ready for further packaging. FIG. 5 shows a close up of an aluminum anchoring point 32 at location 12 forming a tight seal around the optical fibers 4, 6, and outside fused region 8.

Figure 6:
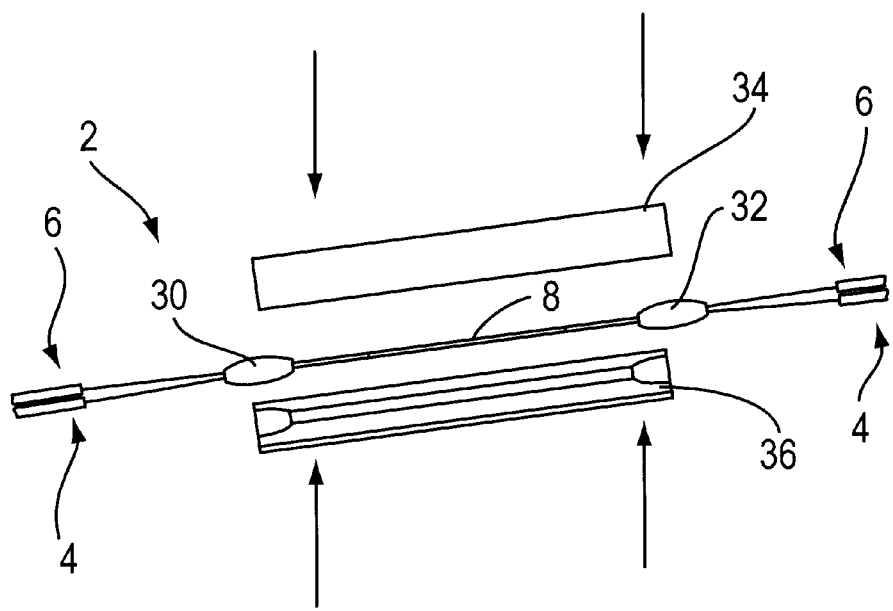
FIG. 6 shows the first layer of packaging where a pair of semi-cylindrical cusps is placed over the fused region and the aluminum anchoring points in the process according to a first embodiment of the invention.

FIG. 6 shows the first layer of packaging of the FBT coupler 2 where a pair of semi-cylindrical cusps 34, 36, shown above and below the coupler 2 comprised of optical fibers 4, 6, are placed over the fused region 8 and the aluminum anchoring points 30, 32.

Figure 7:
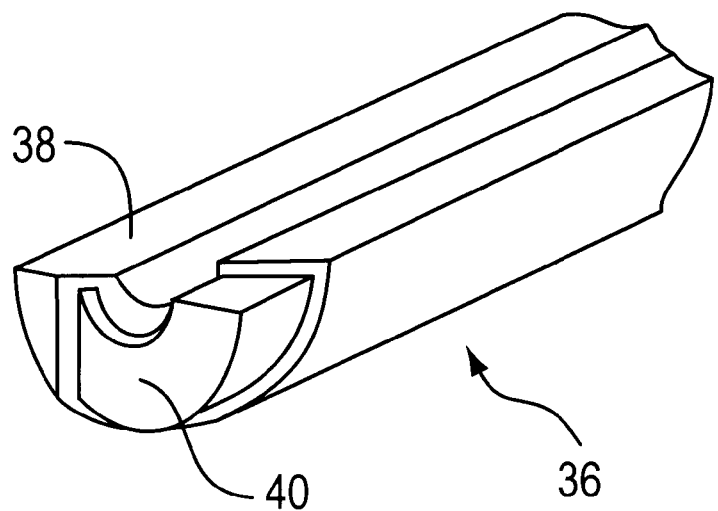
FIG. 7 shows a cross-section of the semi-cylindrical cusp in the process according to a first embodiment of the invention.

FIG. 7 shows a cross-section of the semi-cylindrical cusp 36. Cusp 36 may be comprised of a shell 40 of fused silica, with a similar composition as that of the optical fiber, and with all surfaces coated with a thin layer of pure aluminum 38. Other compositions and/or structures and/or shapes of semi-cylindrical cusp 36 may also be used.

Figure 8:
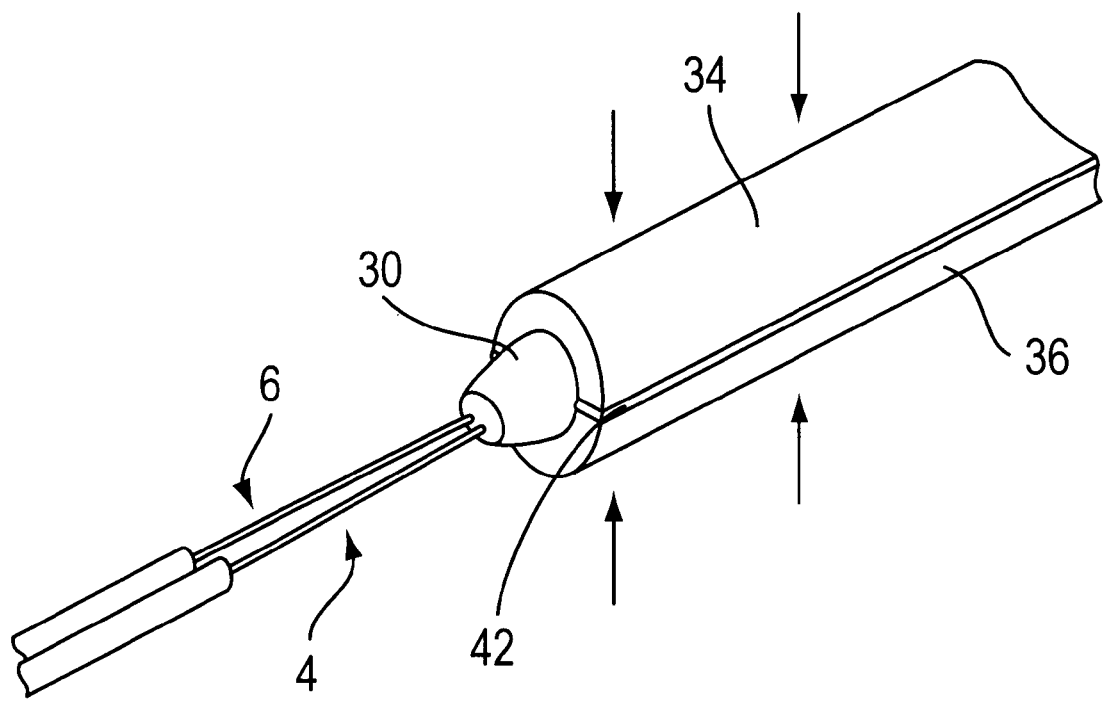
FIG. 8 shows the semi-cylindrical cusps of FIG. 7 pressed together causing the joints between the cusps and the slightly larger anchoring points to be compressed in the process according to a first embodiment of the invention.

FIG. 8 shows semi-cylindrical cusps 34, 36 pressed together causing, creating or forming the joint 42 between the cusps 34, 36. The pressed cusps 34, 36 that are positioned over, for example, anchoring point 30 of optical fibers 4, 6 also cause the anchoring point 30 to be compressed. This causes the softer aluminum to deform around the cusps 34, 36, and anchoring points 30, 32 to seal the packaging end joint surfaces. The joints 42 are also thereby compressed and are then tightly welded and/or sealed (including the end joint surfaces) by the localized application of energy, such as by a laser or ultrasonic transducer. The localized application of energy to seal joints 42 advantageously prevents damage to the device where, for example, the device is highly temperature sensitive and heating of the total device to promote sealing is impossible. Alternatively, the entire structure may be heated to promote the necessary sealing and/or welding.

Figure 9:
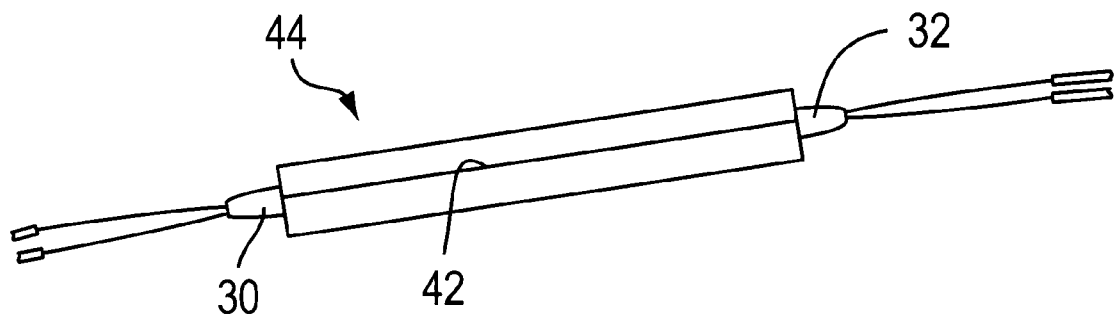
FIG. 9 shows the first layer of the packaging now hermetically sealed around the device in the process according to a first embodiment of the invention.

FIG. 9 is the first layer of the packaging now hermetically sealed around the device resulting in sealed device 44. Sealed device 44 comprises joint 42 with anchor points 30, 32 partially extending therefrom.

Figure 10:
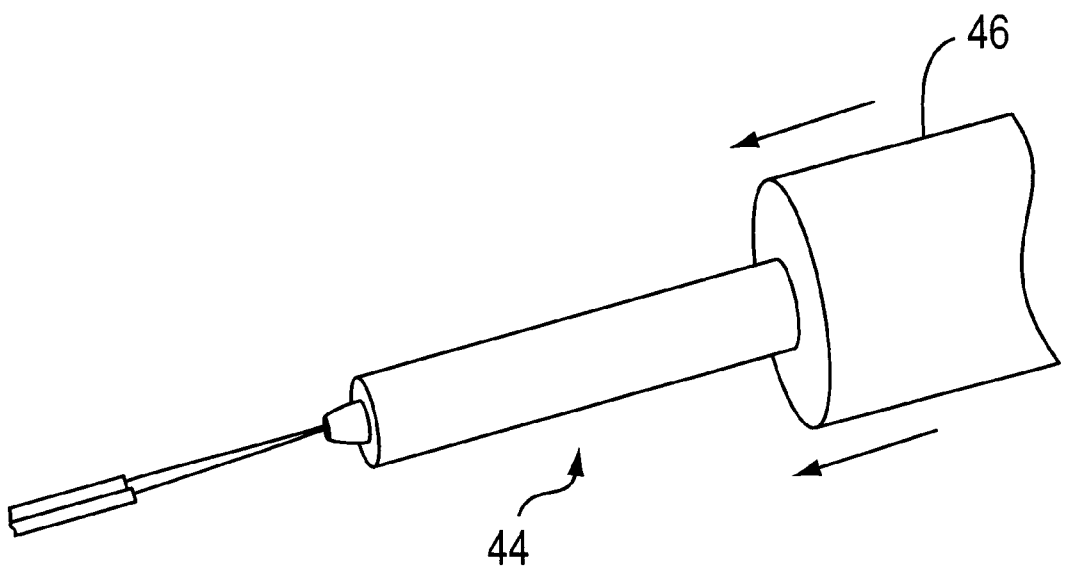
FIG. 10 shows a second layer of packaging where a cylindrical tube is slid over the first layer of packaging in the process according to a first embodiment of the invention.
Figure 11:
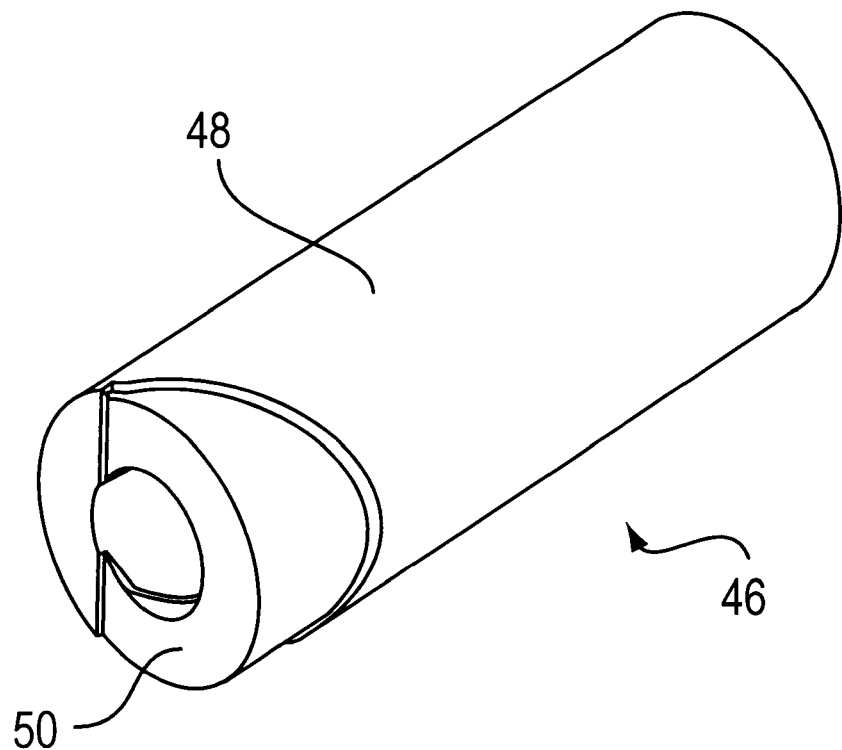
FIG. 11 shows a cross-section of the cylindrical tube of FIG. 10 in the process according to a first embodiment of the invention.

FIG. 10 shows a second layer of packaging, for example, a cylindrical tube 46 in the process of being slid over the first layer of packaging and/or sealed device 44. FIG. 11 shows a cross-section view of the cylindrical tube 46. Cylindrical tube 46 is comprised of a tube 50 of fused silica, with a similar composition as that of an optical fiber, and with all surfaces coated with a thin layer of pure aluminum 48. Other compositions and/or structures and/or shapes of cylindrical tube 46 may also be used.

Figure 12:
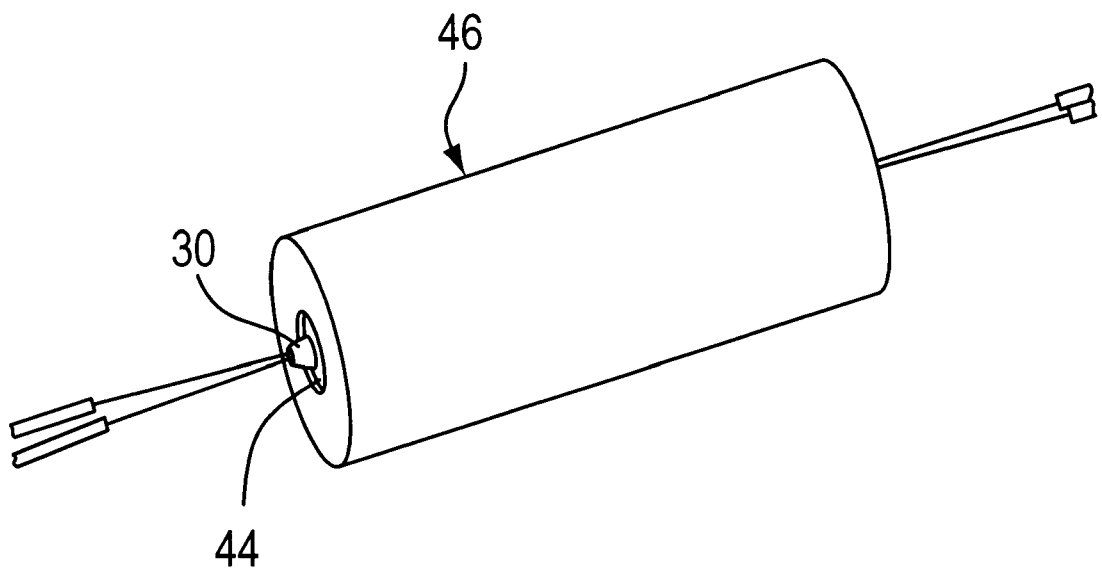
FIG. 12 shows the cylindrical tube of FIG. 10 covering the device in the process according to a first embodiment of the invention.

FIG. 12 shows the cylindrical tube 46 covering the FBT device 44. The cylindrical tube 46 is, for example, the same length as the inner cusps and/or packaging 44, leaving only the ends of the anchoring points 30, 32 (32 not being illustrated) protruding therefrom.

Figure 13:
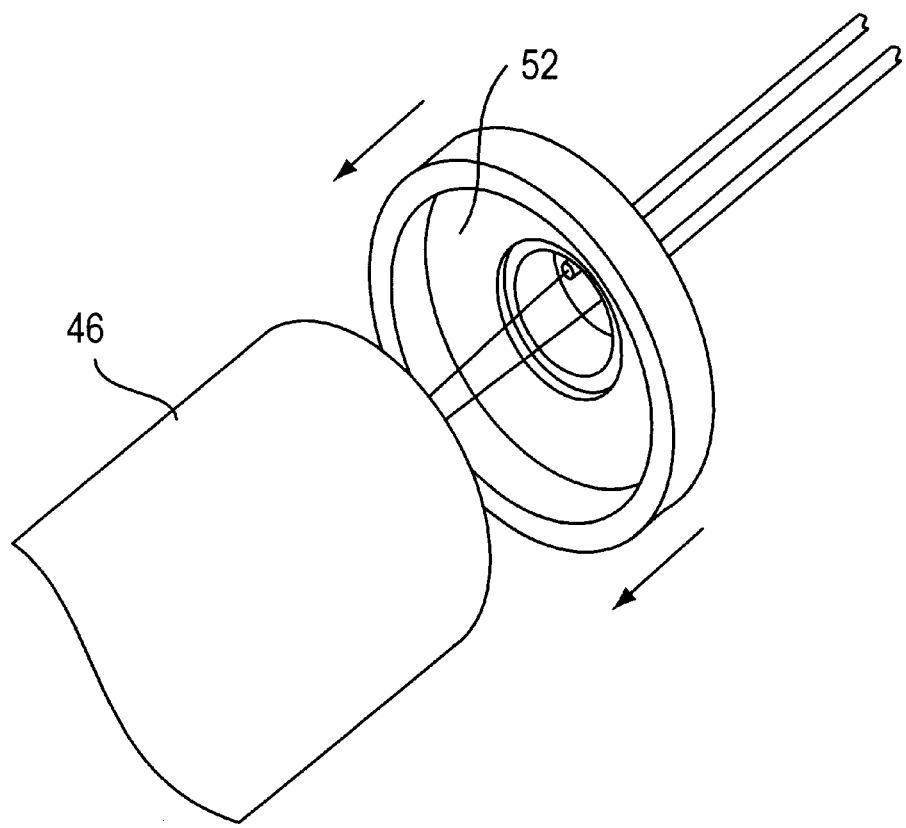
FIG. 13 shows aluminum end-caps that are to be slid over the ends of the cylindrical tube and exposed anchoring points in the process according to a first embodiment of the invention.
Figure 14:
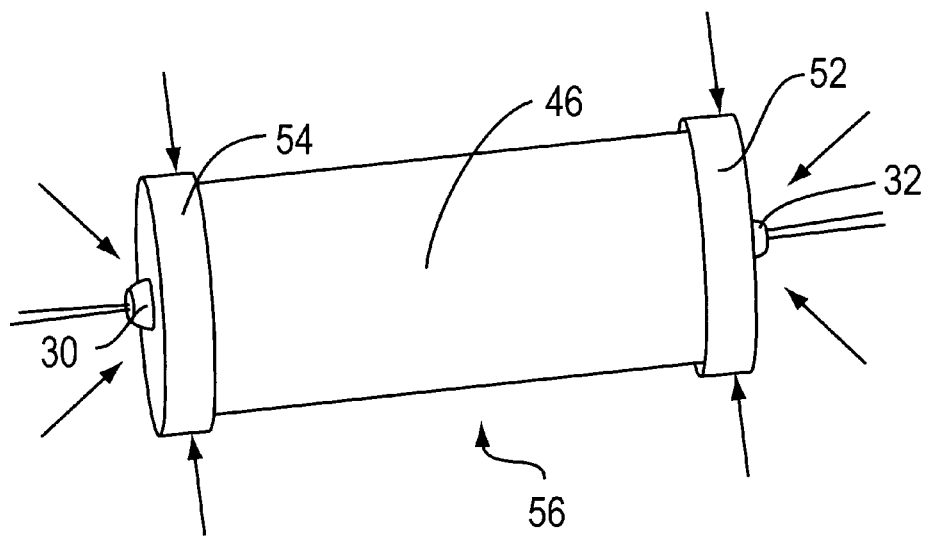
FIG. 14 shows the end-caps of FIG. 13 crimped to form tight junctions with the anchoring points, the ends of the semi-cylindrical cusps, and the cylindrical tube in the process according to a first embodiment of the invention.

FIG. 13 shows an aluminum end-cap 52 being slid over one end of the cylindrical tube 46 and the exposed portion of an anchoring point. FIG. 14 shows end-caps 52, 54 crimped to form tight junctions with the anchoring points 32, 30, respectively, the ends of the semi-cylindrical cusps disposed therein (not shown), and the cylindrical tube 46. The junctions between end caps 52, 54, anchor points 32, 30, tube 46 and cusp ends (not shown) are then tightly welded and sealed by the localized application of energy (or other application of energy such as heating the entire structure/package), such as by a laser or ultrasonic transducer, to prevent damage to the device or the first layer of the packaging.

Figure 15:
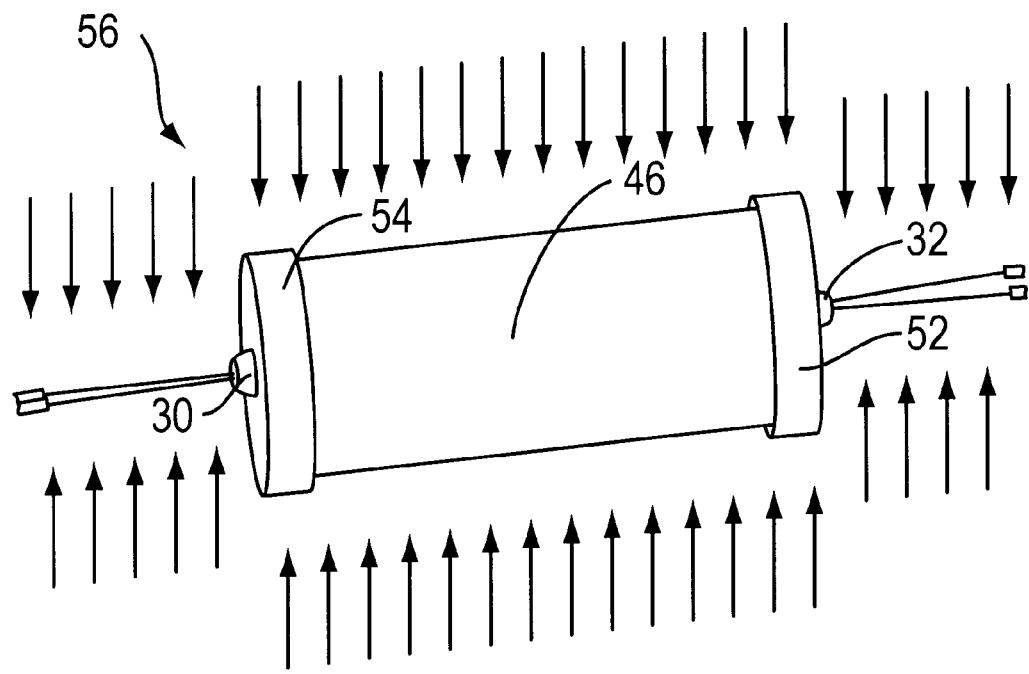
FIG. 15 shows the second layer of the packaging now forming a hermetic seal around the first layer and device in the process according to a first embodiment of the invention.

FIG. 15 shows the second layer of the packaging 46, 52 and 54 now forming a hermetic seal around the first layer and device (not shown except with respect to anchor points 30, 32). The entire device assembly 56, all the exposed optical fiber cladding, and a portion of the optical fiber coating, may be spray-coated and sealed, for example, with a polymer of similar composition to the optical fiber coating.

Figure 16:
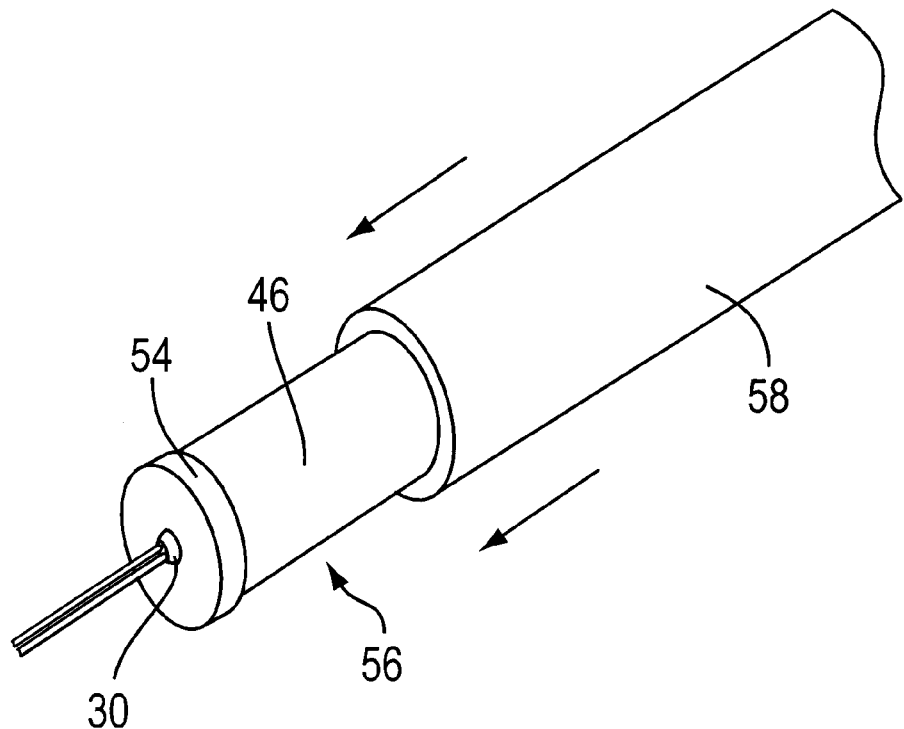
FIG. 16 shows a final layer of packaging including a cylindrical tube slid over the entire device assembly in the process according to a first embodiment of the invention.

FIG. 16 shows a final layer of packaging, a cylindrical tube 58 in the process of being slid over the entire device assembly 56. Cylindrical tube 58 is partially covering packaging 46 with end cap 54 and anchor point 30 still exposed. Other compositions and/or structures and/or shapes of cylindrical tube 58 may also be used.

Figure 17:
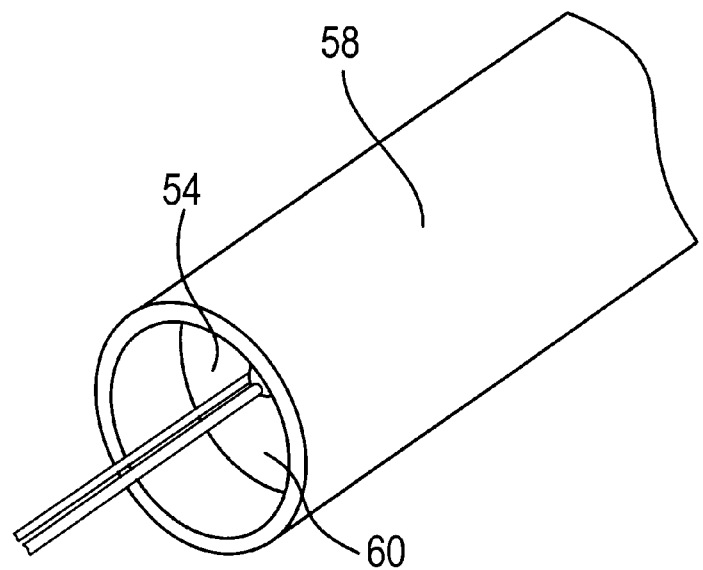
FIG. 17 shows a close up of one end of the final cylindrical tube which covers and extends well beyond the ends of the second layer of packaging in the process according to a first embodiment of the invention.

FIG. 17 shows an enlarged view of one end of the final cylindrical tube 58, which covers and extends well beyond the ends or end caps, for example end cap 54 of the second layer of packaging illustrated at area 60. A sealant, for example, a room temperature vulcanizing (RTV) silicon rubber sealant, is then injected into the end 60 of the final cylindrical tube to secure the device within tube 58 and seal the ends.

Figure 18:
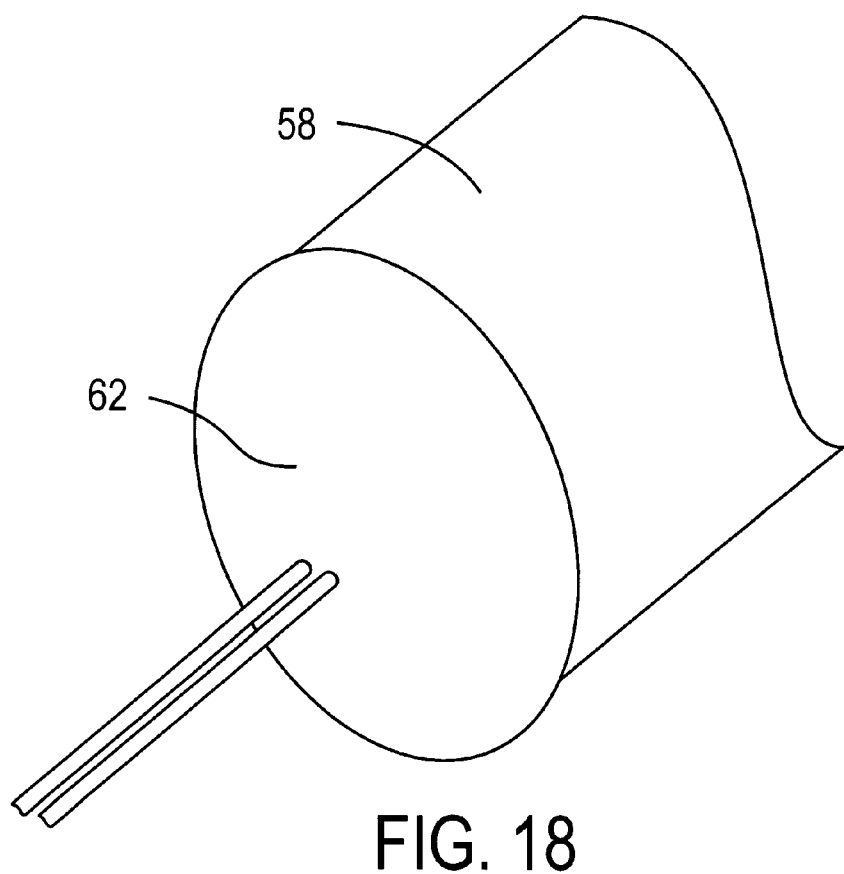
FIG. 18 shows a close up of one end of the final cylindrical tube completely sealed by the sealant in the process according to a first embodiment of the invention.

FIG. 18 shows an enlarged view of one end of the final cylindrical tube 58 completely sealed by the sealant 62. As illustrated above, the cylindrical tube 58 extends beyond the end of the second layer of packaging protecting it, and sealant 62 acts as a strain relief for the optical fibers exiting the FBT device.

Figure 19:
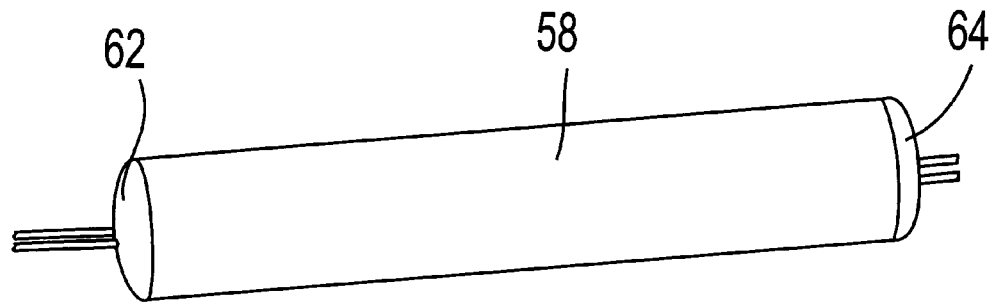
FIG. 19 is a device hermetically sealed and protected from environmental damage and is now ready to be labeled or further packaged in the process according to a first embodiment of the invention.

FIG. 19 is the FBT device hermetically sealed and protected from environmental damage and is now ready to be labeled or further packaged. Cylindrical tube 58 is sealed on both ends via sealant 62, 64.

While the above steps or processes have described a technique for securing and/or sealing and/or hermetically sealing a FBT coupler, the above processes may be used on any optical fiber, device and/or fiber optical device providing or requiring securing and/or bonding of an end and/or portion thereof to an external substrate for support, strength and/or protection. Further, the above process may be modified to suit particular packaging needs where, for example, only one layer of packaging or multiple layers of packaging are required and/or different shapes and/or compositions of packaging are required.

The above process illustrates one method of taking advantage of the simplified and inexpensive securing and/or bonding process of the present invention. Thus, various other packaging techniques may also be used to capitalize on, or use, the above securing and/or bonding process. In addition, other metals or coatings may be used to secure and/or seal the optical fiber, device, and/or fiber optic device in the packaging described herein. Other materials may also be used to seal the ends of the optical fiber, device, and/or fiber optic device as well.

Figure 20:
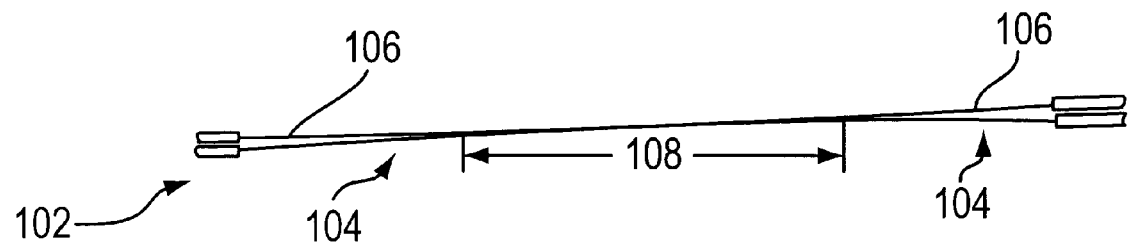
FIG. 20 shows a fused-biconical tapered coupler for use in the process according to a second embodiment of the invention.

For example, FIGS. 20–32 are illustrations of the process of the present invention according to a second embodiment of the invention. FIG. 20 shows a fused-biconical tapered coupler 102 of optical fibers 104, 106 as an exemplary optical fiber, device and/or fiber optic device used with the process of the second embodiment. To properly package this device 102, the fused tapered region 108 must generally be secured, supported, and/or protected without any direct contact with the packaging.

Figure 21:
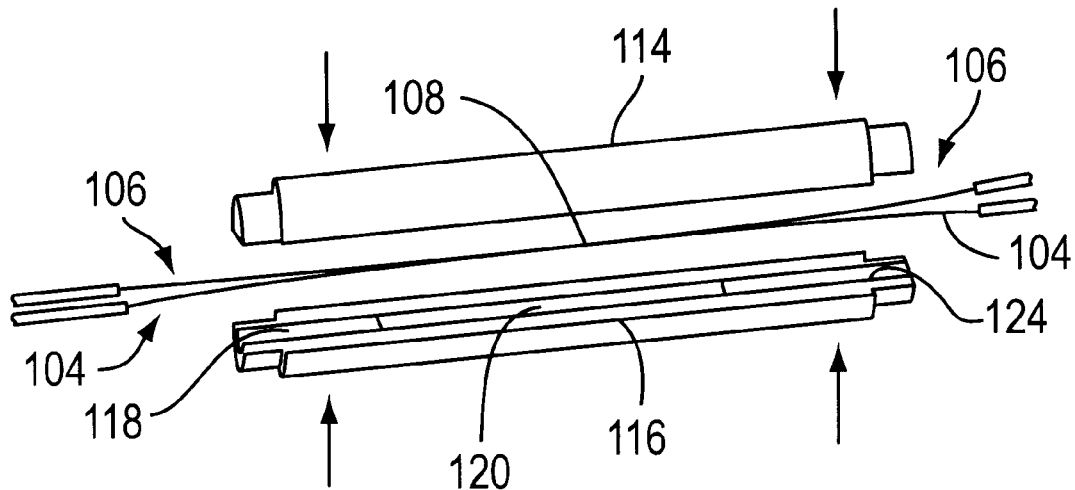
FIG. 21 is the first layer of packaging where a pair of semi-cylindrical cusps are placed over the fused region according to a second embodiment of the invention.

FIG. 21 is the first layer of packaging, a pair of semi-cylindrical cusps 114, 116 having, for example, cavity 120 (not shown in cusp 114), are placed over the fused region 108. Both ends of each semi-cylindrical cusps 114, 116 are filled with, for example, pure aluminum at areas 118, 124, which will be used to attach the optical fibers 104, 106 to the cusps 114, 116. To allow a standard package size to be used, the cusps 114, 116 are generally of sufficient length to always place the aluminum-filled end regions 118, 124 close to, yet safely outside, the fused region 108 which is disposed within, for example, cavity 120.

Figure 22:
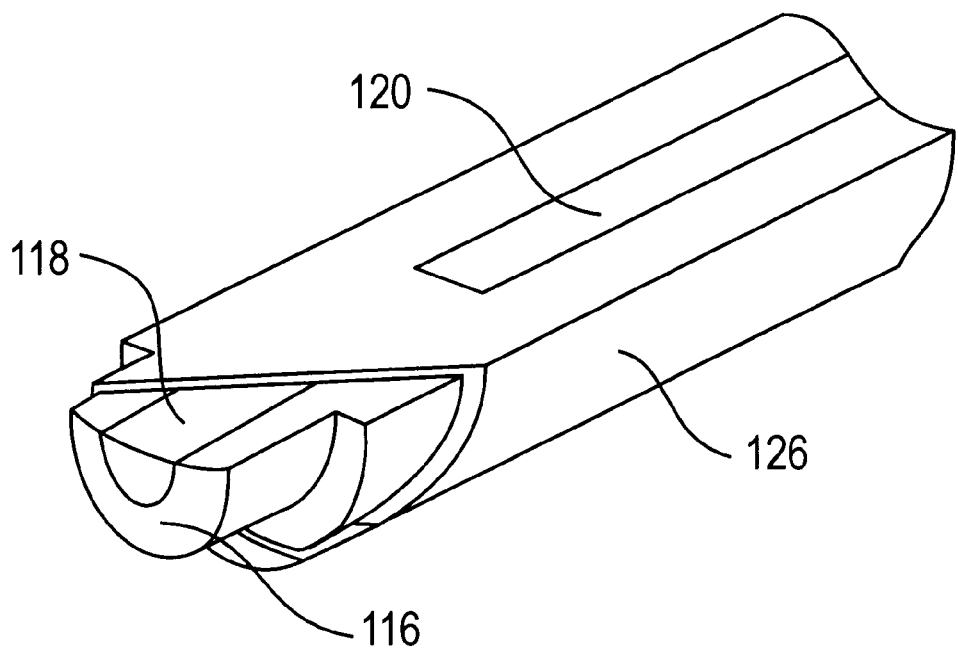
FIG. 22 shows a cross-section of a semi-cylindrical cusp of FIG. 21 according to a second embodiment of the invention.

FIG. 22 shows a cross-section of a semi-cylindrical cusp 116. Cusp 116, is, for example, comprised of a shell of fused silica, with a similar composition as that of an optical fiber, and with all surfaces coated with a thin layer of pure aluminum 126. Cusp 116 includes aluminum-filled end region 118 used to attach, for example, an optical fiber, device, and/or fiber optic device to the cusp 116. In addition, a portion of the optical fiber, device, and/or fiber optic device is disposed within cavity 120 for protection and/or shielding from the environment.

Figure 23:
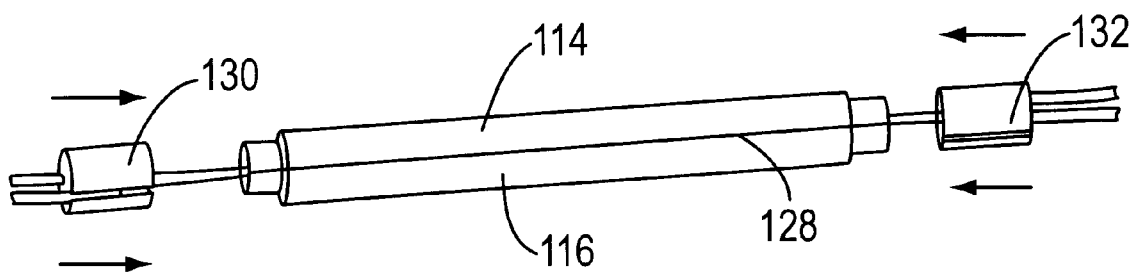
FIG. 23 shows a pair of semi-cylindrical cusps of FIG. 21 now in place over the fused region according to a second embodiment of the invention.

FIG. 23 shows a pair of semi-cylindrical cusps 114, 116 now in place over the fused region (not shown). A pair of, for example, C-shaped tubes 130, 132 are slid over the ends of the semi-cylindrical cusps 114, 116 to hold them in place, forming expansion joint or joining plane or surface 128. The ends of the semi-cylindrical cusps 114, 116 may be indented as shown to allow the C-shaped tubes 130, 132 to hold the assembly without increasing its outside diameter.

Figure 24:
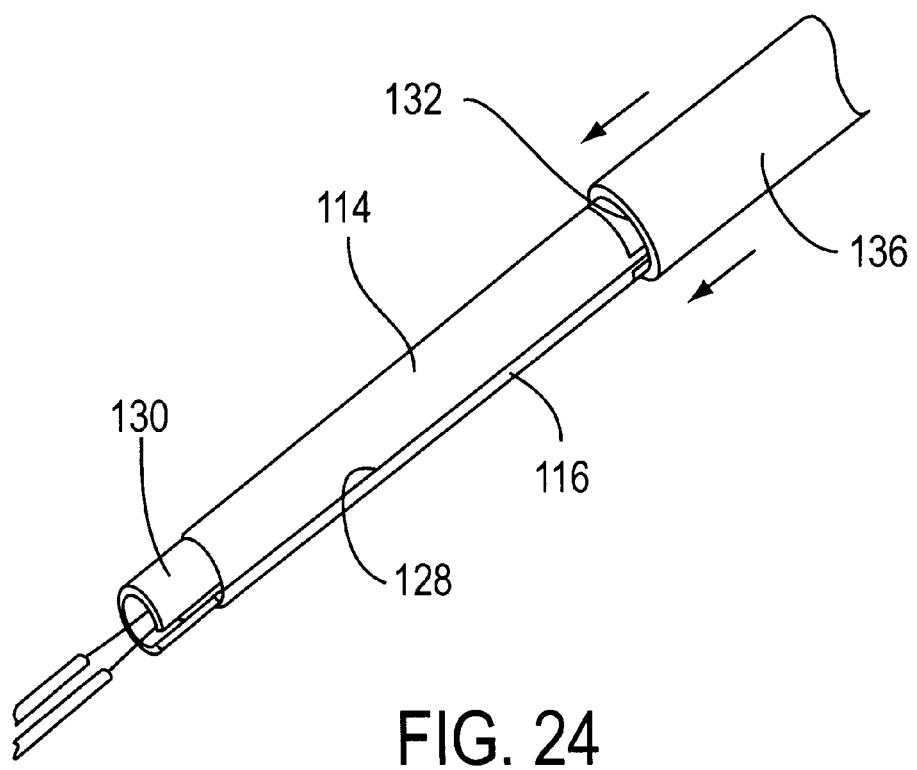
FIG. 24 shows a cylindrical tube of pure aluminum slid over the entire assembly according to a second embodiment of the invention.

FIG. 24 shows a cylindrical tube 136 of, for example, pure aluminum in the process of being slid over the entire assembly. As illustrated, cylindrical tube 136 is partially covering C-shaped tube 132, and in the process of covering cusps 114, 116 having joining surface 128. Cylindrical tube 136 is also in the process of covering C-shaped tube 130.

Figure 25:
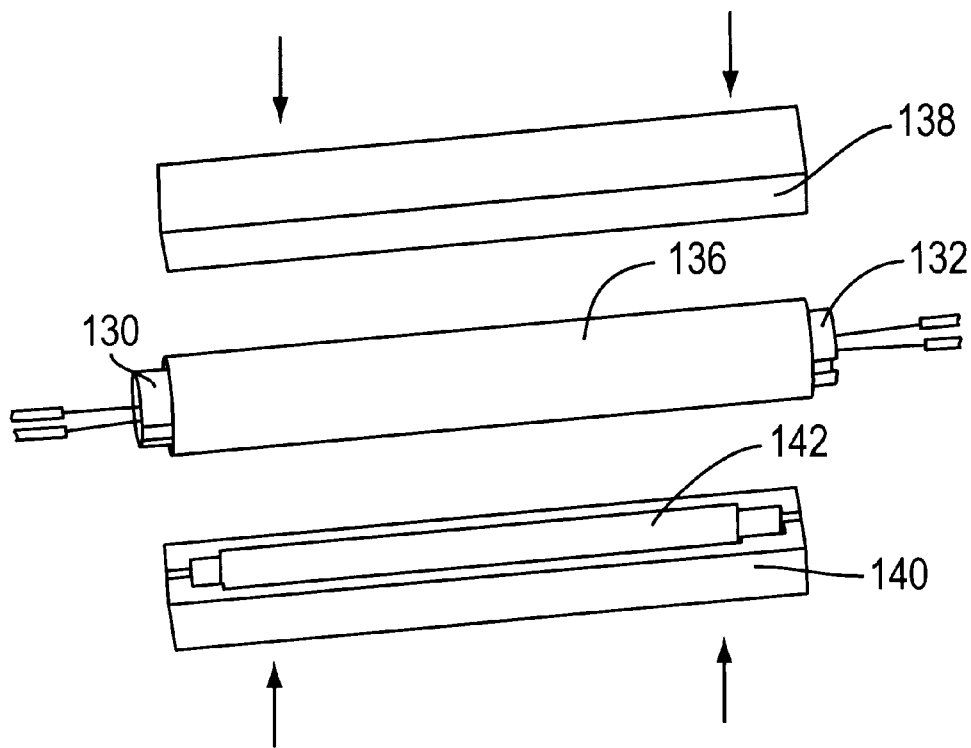
FIG. 25 shows the cylindrical tube of FIG. 24 covering the entire assembly.

FIG. 25 shows the cylindrical tube 136 covering the entire assembly. To seal the FET device, forms or molds 138, 140 are moved into place around the entire assembly comprising tube 136 with C-shaped tubes 130, 132. Form 140 includes, for example, groove 142 (form 138 may also include such a groove) for sealing or use in sealing the FBT device, as described below in greater detail.

Figure 26:
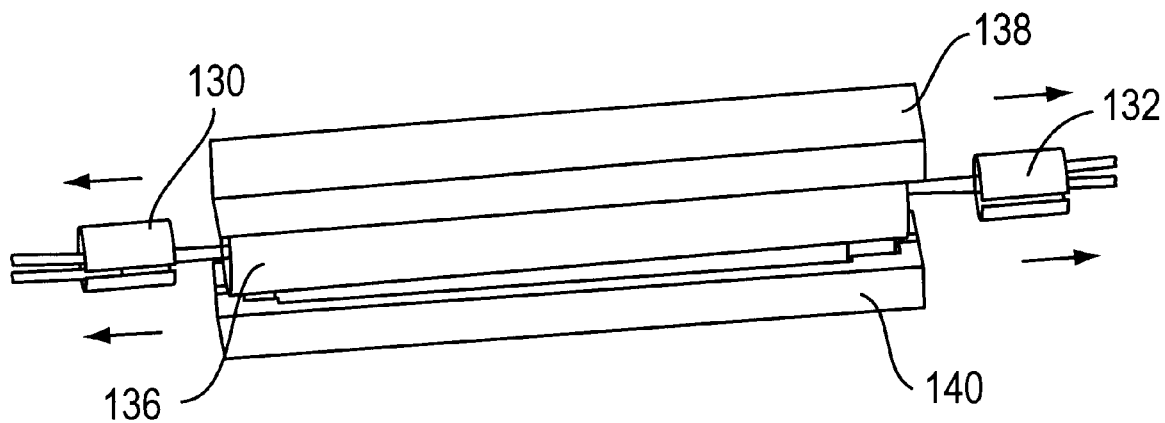
FIG. 26 shows forms in place around the assembly and holding it in place according to a second embodiment of the invention.

FIG. 26 shows the forms 138, 140 in place around the assembly, and holding it in place. The C-shaped tubes 130, 132, no longer required, are now removed from the assembly.

Figure 27:
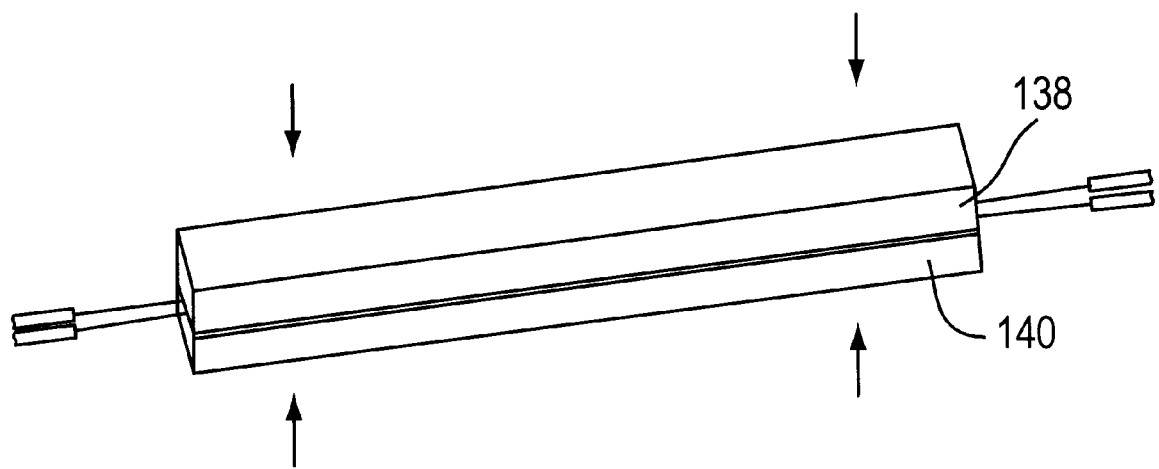
FIG. 27 shows the forms surrounding the assembly now heated and pressed together, causing the entire assembly to be compressed according to a second embodiment of the invention.

FIG. 27 shows forms 138, 140 surrounding the assembly now heated and pressed together, causing the entire assembly to be compressed therebetween. This causes the aluminum to melt and/or deform. Each aluminum-filled end region of the semi-cylindrical cusps (not shown) melt together and completely surround the optical fibers, without contacting the fused region. As the aluminum cools, it safely secures and/or chemically bonds to and/or compresses around the optical fibers, forming a tight seal and securely attaches the optical fibers to the cusps. The aluminum coated surfaces between the semi-cylindrical cusps melt together, welding and/or hermetically sealing the cusp joints.

The cylindrical aluminum tube melts around, and bonds to, the cusps and optical fibers, forming a shell that may also advantageously hermetically seal the entire assembly. As the aluminum shell cools, it compresses the cusps together, ensuring that the assembly is tightly sealed. This structure or expansion joint of alternating layers of aluminum and silica also ensures that a hermetic seal is maintained across a wide temperature range.

The above structure advantageously allows the optical fiber, device, and/or fiber optic device to undergo or experience various environmental changes in conditions, while still having a portion thereof, or its entirety, secured, sealed and/or hermetically sealed. That is, the interplay of alternating layers of material that have different coefficients of expansions facilitates the securing, sealing and/or hermetically sealing of a portion of the optical fiber, device and/or fiber optic device.

For example, the use of alternating materials accomplishes the following. First, a material of higher coefficient of expansion is disposed around the optical fiber, device and/or fiber optic device generally having a lower coefficient of expansion. Next, a material of lower coefficient of expansion is disposed on and/or around the material of higher coefficient of expansion. When the entire structure is heated and/or compressed, the material of higher coefficient of expansion expands, but the outer material does not expand generally at the same rate and/or amount. Thus, the exterior of the device applies what may be considered a compressive force onto the material having a higher coefficient of expansion, thereby securing, sealing and/or hermetically sealing the optical fiber, device and/or fiber optic device thereby. Additional layers of material with similar alternating coefficient of thermal expansion characteristics may also be used, and are considered within the scope of the techniques or methods described herein.

Figure 28:
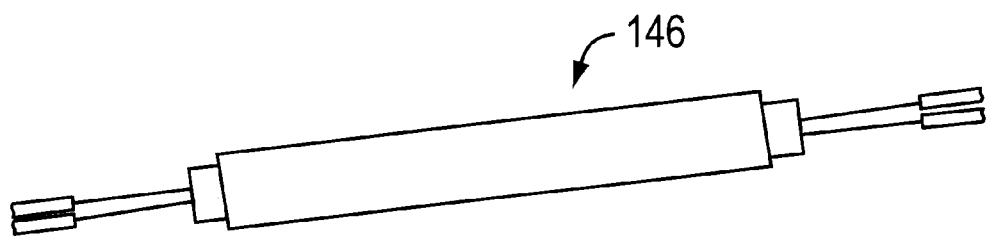
FIG. 28 shows the packaging hermetically sealed around the device according to a second embodiment of the invention.

FIG. 28 shows the packaging is now sealed and/or hermetically sealed around the device 146. The entire device assembly, all the exposed optical fiber cladding, and a portion of the optical fiber coating, may be spray-coated and sealed within, for example, a polymer of similar composition to the optical fiber coating.

Figure 29:
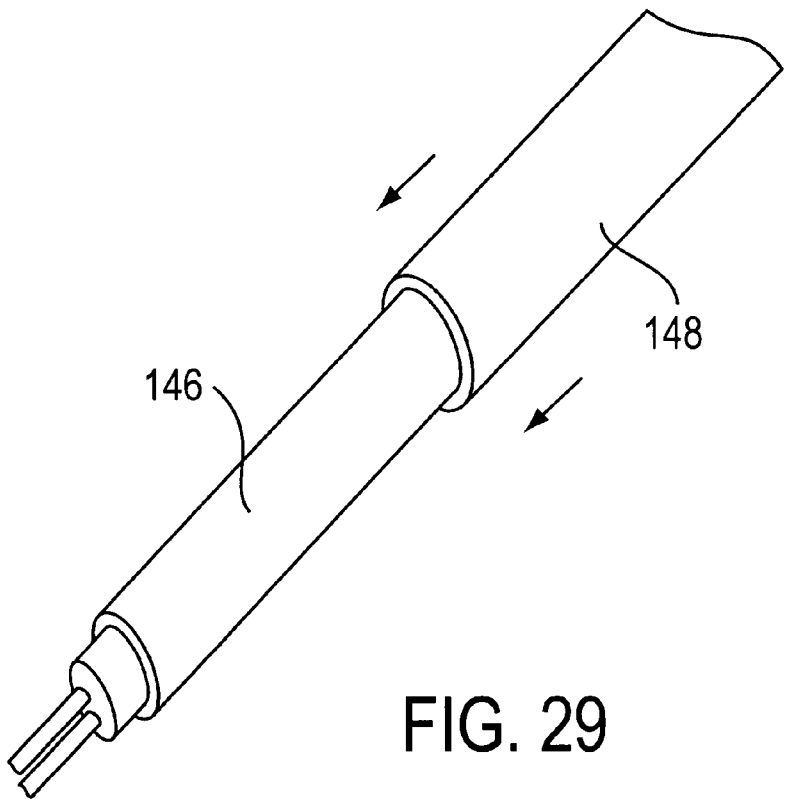
FIG. 29 shows a final layer of packaging where a cylindrical tube is slid over the entire device assembly according to a second embodiment of the invention.
Figure 30:
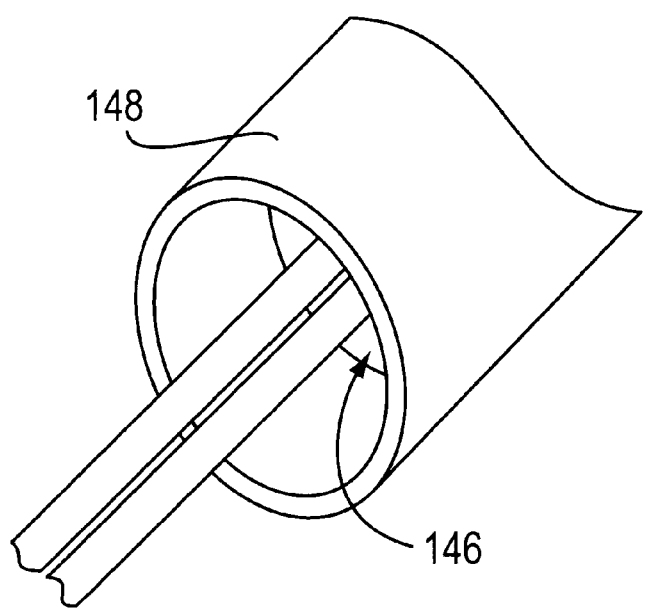
FIG. 30 shows a close up of one end of the cylindrical tube of FIG. 29 which covers and extends well beyond the ends of the inner packaging.

FIG. 29 is a final layer of packaging, a cylindrical tube 148, and is slid over the entire device assembly 146. FIG. 30 shows an enlarged view of one end of the cylindrical tube 148, which covers and extends well beyond the ends of the inner packaging 146. A sealant, for example, a RTV sealant, is injected into the ends of the cylindrical tube 148 to secure the device and seal the ends of tube 148.

Figure 31:
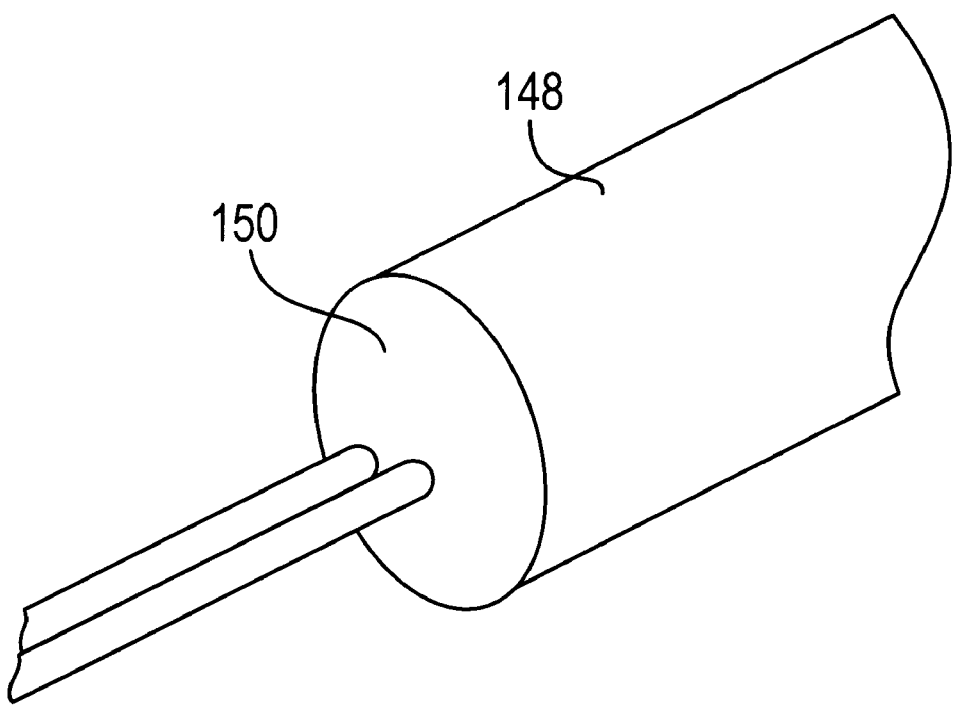
FIG. 31 shows a close up of one end of the cylindrical tube completely sealed by the sealant according to a second embodiment of the invention.

FIG. 31 shows an enlarged view of one end of the cylindrical tube 148 completely sealed by the sealant 150, which extends beyond the end of the tube 148 and also acts as a strain relief for the optical fibers exiting the device.

Figure 32:
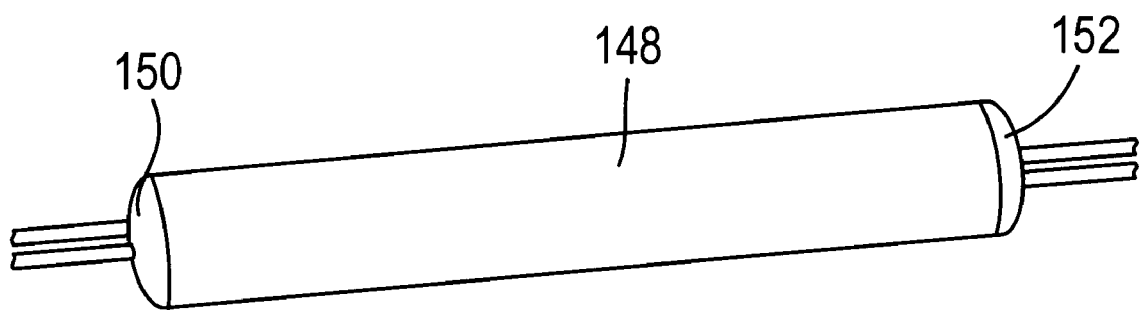
FIG. 32 shows the device hermetically sealed and protected from environmental damage and ready to be labeled or further packaged according to a second embodiment of the invention.

FIG. 32 shows the device is now sealed and/or hermetically sealed and protected from environmental damage via cylindrical tube 148, sealed ends 150, 152, and the remaining structure embedded therein, and is now ready to be labeled or further packaged.

While the above steps or processes have described a technique for securing and/or sealing and/or hermetically sealing a FBT coupler, the above processes may be used on any optical fiber, device and/or fiber optical device providing or requiring bonding of a portion and/or an end thereof to an external substrate for support, strength and/or protection. Further, the above process may be modified to suit particular packaging needs where, for example, only one layer of packaging or multiple layers of packaging are required or where different shapes and/or structures and/or compositions of packaging are required.

The above process illustrates one method of taking advantage of the simplified and inexpensive securing and/or bonding process of the present invention. Thus, various other packaging techniques may also be used to capitalize on, or use, the above bonding process. In addition, other metals, materials and/or coatings may be used to seal and/or secure the optical fiber, device, and/or fiber optic device in the packaging described herein. Other materials may also be used to seal the ends of the optical fiber, device, and/or fiber optic device as well.

The cusp described herein may be modified in numerous ways to facilitate the securing process described herein. For example, the cusp may be modified so that no cavity is required, and/or so that the cusp is of relative short length. In this instance, the cusp is used to secure to a portion of an optical fiber, fiber optic device and/or device, instead of the encasing of same.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. An apparatus, comprising:
   at least one optical fiber including a device region with first and second portions of said at least one optical fiber connected to opposite sides of said device region;
   first and second metal seals bonding with the first and second portions of said at least one optical fiber respectively, and surrounding the device region of the at least one optical fiber;
   an enclosure having a cavity and covering the device region between the first and second metal seals, the enclosure comprising a deformable metal layer sealing to the first and second metal seals responsive to at least one of a compressive force or energy, and encasing the device region in the cavity.

2. An apparatus, comprising:
   at least one fiber optic device including a device region with first and second optical fibers connectable to opposites ends of the device region; and an enclosure surrounding the device region of the at least one fiber optic device, and including a deformable metal layer having a cavity encasing the region therein and first and second seals engaging with, and securing to, the first and second optical fibers respectively, wherein the first and second seals of the deformable metal layer provides a seal with the first and second optical fibers responsive to at least one of a compressive force or energy, and encasing the region in the cavity.

3. An apparatus, comprising:

at least one optical fiber including a device region and having a first thermal coefficient of expansion said at least one optical fiber connected to opposite sides of said device region;

a first securing material engaging the at least one optical fiber on the opposite sides of the device region and surrounding the device region of the at least one optical fiber and having a second thermal coefficient of expansion greater than the first thermal coefficient of expansion;

a cusp having first and second sections and a cavity, and covering the first securing material and the region, the cusp comprising interior and exterior sections, the interior section having a third thermal coefficient of expansion substantially similar to the first thermal coefficient of expansion, and the exterior section having a fourth thermal coefficient of expansion substantially similar to the second thermal coefficient of expansion.

4. An apparatus, comprising:

at least one fiber optic device including a device region with first and second optical fibers connectable to opposites ends of the device region and having a first thermal coefficient of expansion;

a first securing material surrounding the region of the at least one fiber optic device, and having a second thermal coefficient of expansion greater than the first thermal coefficient of expansion;

a cusp having first and second sections and a cavity and covering the first securing material and the region, the first and second sections engaging with, and securing to, the first securing materials and the first and second optical fibers respectively,, the cusp having a third thermal coefficient of expansion substantially similar to the first thermal coefficient of expansion, and an expansion joint between the first and second sections, the expansion joint having a fourth thermal coefficient of expansion substantially similar to the second thermal coefficient of expansion.

5. An apparatus, comprising:

at least one fiber optic device, including a device region with first and second optical fibers connectable to opposites ends of the device region and having a first thermal coefficient of expansion;

a first metal alloy securing material surrounding the device region of the at least one fiber optic device and disposed at least on a portion of the first and second optical fibers, and having a second thermal coefficient of expansion greater than the first thermal coefficient of expansion;

a cusp having first and second sections and a cavity and covering the first metal alloy securing material and the region, the cusp having at least one metal alloy expansion joint between the first and second sections, the at least one metal alloy expansion joint having a third thermal coefficient of expansion substantially similar to the second thermal coefficient of expansion.

6. A apparatus of claims 1, 2, 3, 4, or 5, wherein the fiber optic device comprises at least one of a wavelength division multiplexer, a wideband fiber optic coupler, a coupler, a switch, a filter, an attenuator, a waveguide, a fiber optic sensor, a sensor and a polarizer.

7. An apparatus, comprising:

a device having at least one exposed region having at least one optical fiber connected thereto;

first and second metal seals bonding with, and surrounding, the exposed region of the device, at least one of the and second metal seals engaging with the at least one optical fiber;

an enclosure sealing the device between the first and second metal seals, the enclosure having a first substrate and a second substrate each with end surfaces comprising a deformable metal layer, sealing the corresponding surfaces in response to at least one of application of a compressive force and energy to the first and second substrates.

8. A apparatus of claim 7, wherein the device comprises at least one of a wavelength division multiplexer, a wideband fiber optic coupler, a coupler, a switch, a filter, an attenuator, a waveguide, an optical fiber, a fiber optic sensor, a sensor and a polarizer.

9. A method, comprising the steps of:

(a) providing at least one optical fiber, device and fiber optic device, including a region and having a first thermal coefficient of expansion;

(b) disposing a securing material at the region of the at least one optical fiber, device and fiber optic device, the securing material having a second thermal coefficient of expansion greater than the first thermal coefficient of expansion;

(c) covering the securing material and the region with first and second sections, the first and second sections having third and fourth thermal coefficients of expansion substantially similar to the first thermal coefficient of expansion;

(d) providing an expansion joint between the first and second sections, the expansion joint having a fifth thermal coefficient of expansion substantially similar to the second thermal coefficient of expansion; and (e) applying at least one of a compressive force or energy to at least one of seal, secure and hermetically seal the at least one optical fiber, device and fiber optic device using the securing material and the first and second sections.

10. An optical fiber, device or optical fiber device produced in accordance with the process of claim 9.

11. An apparatus, comprising:

at least one optical fiber, device and fiber optic device, including a region with first and second portions;

first and second metal seals bonding with the first and second portions respectively, the first and second portions being on opposite sides of the region of the at least one optical fiber, device and fiber optic device;

an enclosure having a cavity and covering the region between the first and second metal seals, the enclosure comprising a deformable metal layer sealing to the first and second metal seals responsive to at least one of a compressive force or energy, and encasing the region in the cavity.

12. An apparatus, comprising:

at least one optical fiber, device and fiber optic device, including a region with first and second portions;

first and second metal anchor portions bonding with the first and second portions respectively, and positioned on opposite sides of the region of the at least one optical fiber, device and fiber optic device;

an enclosure having a cavity and covering the region between the first and second metal seals, the enclosure comprising a deformable metal plate portion adhering to the first and second metal seals, and enclosing the region in the cavity.

13. An apparatus, comprising:

at least one optical fiber, device and fiber optic device including a zone with first and second portions; and an enclosure surrounding the zone of the at least one optical fiber, device and fiber optic device, and including a deformable metal portion having a cavity encasing the zone therein and first and second anchor portions engagable with the first and second portions respectively, wherein the first and second anchor portions of the deformable metal portion provides a seal with the first and second portions, and enclosing the zone in the cavity.

14. An apparatus, comprising:

at least one optical fiber, device and fiber optic device, including an area and having a first thermal coefficient of expansion;

a first material disposed on opposite sides of the area of the at least one optical fiber, device and fiber optic device, and having a second thermal coefficient of expansion greater than the first thermal coefficient of expansion;

a cusp having first and second sections and a cavity, the first and second sections engaging the first material disposed on the opposite sides of the area, the cusp comprising interior and exterior sections, the interior section having a third thermal coefficient of expansion substantially similar to the first thermal coefficient of expansion, and the exterior section having a fourth thermal coefficient of expansion substantially similar to the second thermal coefficient of expansion.

15. An apparatus, comprising:

at least one optical fiber, device and fiber optic device, including an area and having a first thermal coefficient of expansion;

a first material disposed on opposite sides of the area of the at least one optical fiber, device and fiber optic device, and the second material having a second thermal coefficient of expansion greater than the first thermal coefficient of expansion;

a cusp having first and second sections and a cavity, the first and second sections engaging the first material disposed on the opposite sides of the area, and the cusp having a third thermal coefficient of expansion substantially similar to the first thermal coefficient of expansion, and an expansion joint between the first and second sections, the expansion joint having a fourth thermal coefficient of expansion substantially similar to the second thermal coefficient of expansion.

16. An apparatus, comprising:

at least one optical fiber, device and fiber optic device, including an area and having a first thermal coefficient of expansion;

a material disposed on opposite sides of the area of the at least one optical fiber, device and fiber optic device, and having a second thermal coefficient of expansion greater than the first thermal coefficient of expansion;

a cusp having first and second sections and a cavity, the first and second sections engaging the material disposed on the opposite sides of the area, and the cusp having an expansion joint between the first and second sections, the expansion joint having a third thermal coefficient of expansion substantially similar to the second thermal coefficient of expansion.

17. A apparatus of claims 12, 13, 14, 15, or 16, wherein the fiber optic device comprises at least one of a wavelength division multiplexer, a wideband fiber optic coupler, a coupler, a switch, a filter, an attenuator, a waveguide, a fiber optic sensor, a sensor and a polarizer.

18. An apparatus, comprising:

a device having at least one exposed region;

first and second anchor portions bonding with, and disposed on opposite sides of the exposed region of the device;

an enclosure securing the device between the first and second metal seals, the enclosure having a substrate with end surfaces comprising a deformable metal layer, and securing to the corresponding first and second anchor portions with the exposed region disposed therein.

19. A apparatus of claim 18, wherein the device comprises at least one of a wavelength division multiplexer, a wideband fiber optic coupler, a coupler, a switch, a filter, an attenuator, a waveguide, an optical fiber, a fiber optic sensor, a sensor and a polarizer.

20. A method of packaging at least one optical fiber, device and fiber optic device, including a region, comprising the steps of:

(a) disposing a metal securing material at the region of the at least one optical fiber, device and fiber optic device;

(b) covering the metal securing material and the region with first and second sections;

(c) providing an expansion joint between the first and second sections; and (d) at least one of sealing, securing and hermetically sealing the at least one optical fiber, device and fiber optic device in the first and second sections using the metal securing material, the first and second sections and the expansion joint.

21. An optical fiber, device or optical fiber device produced in accordance with the process of claim 20.

22. An apparatus, comprising:

at least one optical fiber, device and fiber optic device, including a region;

a metal seal securing to the region, the region being on at least one side of the at least one optical fiber, device and fiber optic device; and an enclosure having a cavity and covering the region, the enclosure comprising a deformable metal layer sealing to the metal seal, responsive to at least one of a compressive force or energy.

23. A method of packaging at least one optical fiber, device and fiber optic device, comprising the steps of:

(a) forming at least one metal seal at least one of on and between housing elements; and (b) sealing the at least one optical fiber, device and fiber optic device at least one of in and to the housing elements via sealing the at least one metal seal.

* * * * *